(12) United States Patent
Von Mezynski

(10) Patent No.: US 9,527,493 B2
(45) Date of Patent: Dec. 27, 2016

(54) IMPLEMENT ILLUMINATION CONTROL SYSTEM

(75) Inventor: Christian Von Mezynski, Kaiserslautern (DE)

(73) Assignee: DEERE & COMPANY, Moline, IL (US)

( * ) Notice: Subject to any disclaimer, the term of this patent is extended or adjusted under 35 U.S.C. 154(b) by 1062 days.

(21) Appl. No.: 13/158,983

(22) Filed: Jun. 13, 2011

(65) Prior Publication Data

US 2012/0316735 A1    Dec. 13, 2012

(30) Foreign Application Priority Data

Jun. 29, 2010  (DE) ........................ 10 2010 030 649

(51) Int. Cl.
| | |
|---|---|
| *B60Q 7/02* | (2006.01) |
| *B60R 1/00* | (2006.01) |
| *B60W 10/00* | (2006.01) |
| *B60Q 1/08* | (2006.01) |
| *B60Q 1/24* | (2006.01) |

(52) U.S. Cl.
CPC ............. *B60W 10/00* (2013.01); *B60Q 1/085* (2013.01); *B60Q 1/245* (2013.01); *B60Q 7/02* (2013.01); *B60Q 2300/14* (2013.01); *B60Q 2300/21* (2013.01); *B60Q 2300/32* (2013.01); *B60R 1/003* (2013.01); *B60Y 2200/22* (2013.01)

(58) Field of Classification Search
CPC .................................. B60Q 7/02; B60R 1/003
USPC .............................................. 701/48, 49, 50
See application file for complete search history.

(56) References Cited

U.S. PATENT DOCUMENTS

| | | | |
|---|---|---|---|
| 3,934,134 A | | 1/1976 | Wassel |
| 5,257,020 A | * | 10/1993 | Morse ........................ 340/908.1 |
| 5,442,527 A | | 8/1995 | Wichelt |
| 7,216,555 B2 | * | 5/2007 | Drummond et al. ....... 73/864.45 |
| 7,860,628 B2 | * | 12/2010 | Lange ............................. 701/50 |
| 8,246,271 B2 | * | 8/2012 | Verhoff ......................... 404/117 |

(Continued)

FOREIGN PATENT DOCUMENTS

| | | | | |
|---|---|---|---|---|
| DE | 202004004805 U1 | | 8/2005 | |
| DE | 20204004805 U1 | * | 9/2005 | ............. B66C 23/36 |

(Continued)

OTHER PUBLICATIONS

ISO, Standard 11783—"Tractors and machinery for agriculture and forestry—Serial control and communications data network, Parts 6, 7 and 10", http://www.iso.org/iso/, 2009.

(Continued)

*Primary Examiner* — Fadey Jabr
*Assistant Examiner* — Thomas Ingram

(57) ABSTRACT

A control system controls a light source which illuminates an implement coupled to a utility vehicle. The control system includes a vehicle control unit and a data bus which is connected to the vehicle control unit, the light source and an actuator which adjusts the light source. An implement control unit is mounted in the implement and is connected to the data bus. The implement control unit transmits, via the data bus, data regarding the work width and/or work height and/or position of the implement with respect to the utility vehicle. The vehicle control unit, in response to the data transmitted from the implement control unit, controls the actuator to adjust of the orientation and/or of the opening angle of a light cone of the light source.

7 Claims, 1 Drawing Sheet

(56) References Cited

U.S. PATENT DOCUMENTS

2005/0117364 A1\* 6/2005 Rennick et al. .............. 362/540
2008/0228360 A1\* 9/2008 Nelson et al. ................. 701/50
2010/0039505 A1\* 2/2010 Inoue et al. ................... 348/61

FOREIGN PATENT DOCUMENTS

DE 202004004805 9/2005
EP 2158799 A1 3/2010

OTHER PUBLICATIONS

European Search Report, dated Mar. 3, 2014 (6 pages).

\* cited by examiner

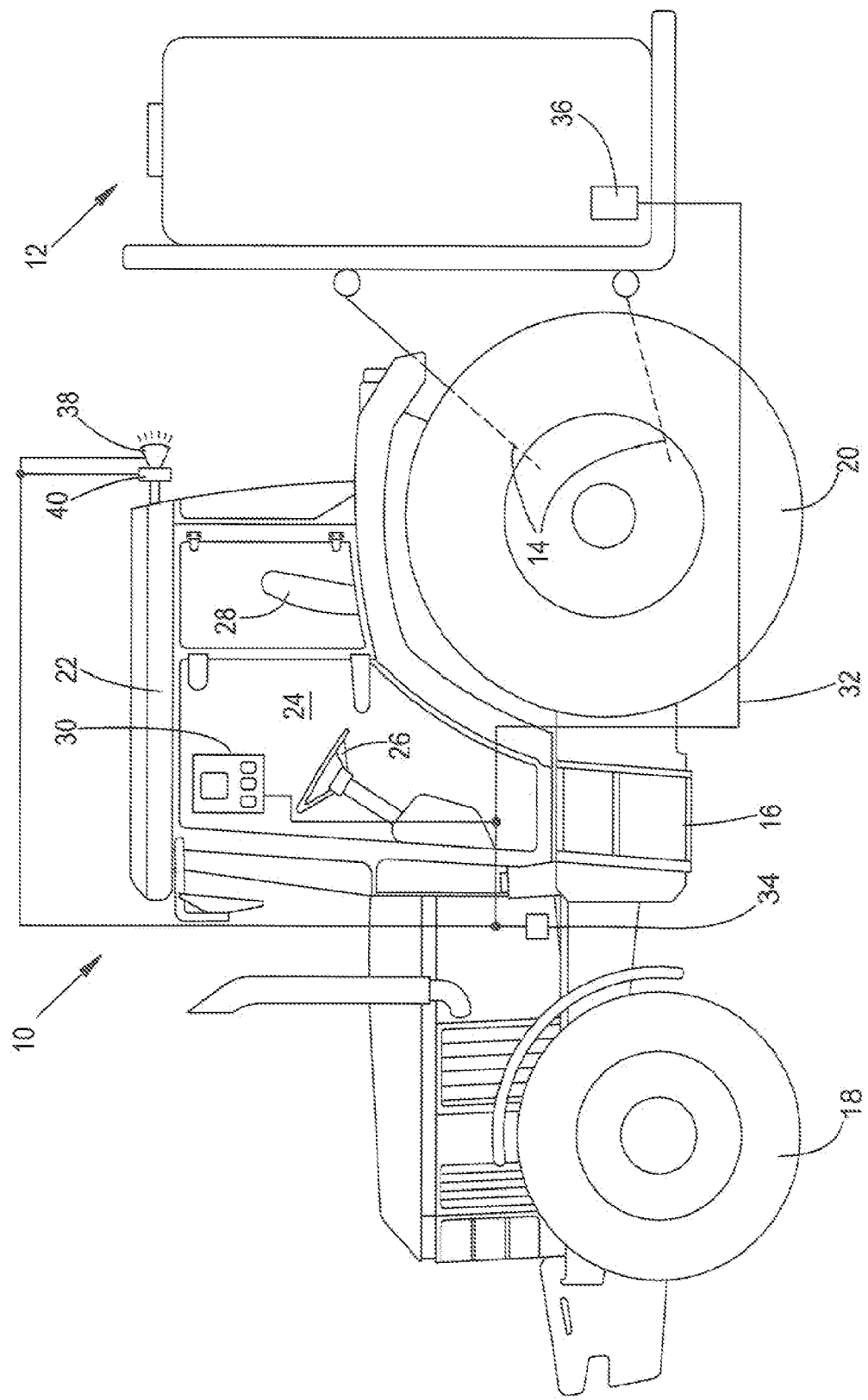

IMPLEMENT ILLUMINATION CONTROL SYSTEM

FIELD OF THE INVENTION

The present disclosure relates to a system for controlling illumination of an implement coupled to a utility vehicle.

BACKGROUND OF THE INVENTION

ISO 11783 is known standard regarding data transfer and display in agricultural vehicles. Bus systems, which are designed according to this standard, include electronic control units which control the actuators of a vehicle or apparatus connected to them, and/or receive measurement values from sensors. One or more control units working together are referred to as a working set. The control units are connected to each other and to a so-called virtual terminal by a data bus (hereafter simply called bus). The virtual terminal allows a display of measured work parameters and/or their target values, and an entry of desired target values for certain parameters by an operator, and it serves as an operator interface for the control units or working sets.

ISO 11783 regulates, among other aspects, a control of the illumination of a tractor and of the illumination of an implement attached to the tractor via the bus. Each illumination control unit of the tractor and of the implement transmits a corresponding message to the electronic control unit (ECU) of the tractor, which in turn switches the selected illumination elements on and off, for example, headlights, driving lights, driving directly indicator, brake lights, fog lights, positioning lights and working place light fixtures of the tractor and/or implement. In each case, the illumination lamp was switched on and off to illuminate the implement optimally, but there was no lamp resetting or alignment.

Moreover, the control unit of the apparatus under ISO 11783 transmits, via the bus, data regarding the physical parameters of the implement, such as, the work width and work depth. These data are needed primarily for navigation and documentation purposes.

DE 20 2004 004 805 U1 describes a crane whose illumination lamp is oriented by means of data transmitted via a bus onto the moved object.

SUMMARY

The tractors usually have implement illuminating lamps which are directed forwards and/or backwards, to be able to see and monitor the implement during fieldwork in twilight or darkness. To date, the precise orientation of this illumination with respect to the implement has been carried out manually by the driver of the tractor. If a given tractor is now to be operated with a different implement, the reorientation of the implement illumination which needs to be carried out in each case turns out to be time consuming and subject to error.

The problem which is the basis of the invention consists in providing a system for controlling the orientation of the implement illumination with respect to an implement coupled to a utility vehicle.

A control system for controlling implement illuminating lamps mounted on a utility vehicle comprises a steering unit of the utility vehicle, which is connected to an light source and a data bus, and an implement control unit, which is connectable or connected to the data bus. The steering unit of the utility vehicle can transmit, via the data bus, data pertaining to the work width and/or work height and/or position of the implement with respect to the utility vehicle. The steering unit is connected to an actuator for adjusting the orientation and/or the opening angle of the light cone of the light source, and it controls the actuator as a function of the data transmitted via the bus, with regard to work width and/or work height and/or position of the implement with respect to the utility vehicle, so that the light source is oriented optimally with respect to the implement, and the latter can be optimally illuminated automatically based on its given physical dimensions.

As a result, no manual adjustment of the light source is needed when changing implements, which facilitates the adjustment of the implement illumination for the driver of the utility vehicle.

The actuator can adjust the horizontal and/or vertical alignment of the implement illuminating light source. In addition, the steering unit can select one or more implement illuminations from different implement illuminations, for example, as a function of whether the implement is attached from the front or back to the utility vehicle, or it can switch on additional implement illuminations that are oriented outwards, in the case of greater work widths.

Moreover, the control unit of the implement can transmit, via the data transfer device, data regarding the attachment point of the implement on the utility vehicle, for example, whether it is attached on the front or the back or the top or at the bottom to the coupling device on the utility vehicle. The steering unit controls the actuator based on these data, in order to orient the light source optimally with respect to the implement. The light source can be attached on the utility vehicle and/or implement.

This implement illumination control system is suitable for any commercial vehicles and also other commercial and utility vehicles, particularly for self-propelled tractors and harvesting machines.

BRIEF DESCRIPTION OF THE DRAWINGS

The sole FIGURE is a schematic side view of a utility vehicle with an implement and an implement illumination control system according to the invention.

DETAILED DESCRIPTION OF THE DRAWINGS

Referring to the sole FIGURE, an implement 12, such as a field sprayer, is attached to a three-point hitch 14 of a utility vehicle 10, such as an agricultural tractor. The vehicle 10 includes a supporting frame 16, which is supported by steerable front wheels 18 and drivable rear wheels 20, and which supports a cabin 22, in which an operator work place or station 24 is located. The operator station 24 includes a steering wheel 26, a seat 28, pedals (not shown), and a virtual terminal 30.

The virtual terminal 30 is connected to a data transfer device or bus 32, which is preferably a serial data bus. The system also includes a vehicle electronic control unit 34 which mounted in the vehicle 10 and connected to the bus 32. The system also includes an implement control unit 36 which mounted in the implement 12 and is also connected to the bus 32. The control unit 34, the control unit 36, and the virtual terminal 30, exchange messages between each other during the operation of the vehicle 10 via the bus 32. Additional control units (not shown) may be connected to the bus 32 for communication with virtual terminal 30 and optionally other control units via the bus 32. The protocol used here corresponds preferably to ISO 11783.

A light source 38 illuminates the implement 12, and is attached to the roof of the cabin 22, but it could also be attached elsewhere on the vehicle 10. Additional implement illuminating light sources (not shown) could be mounted on the roof of the cabin 22. The control unit 34 is connected to the light source 38 via the bus 32 and controls the light source 38. The control unit 34 also controls (possibly among other functions) the illumination of the vehicle 10, for example, the front and rear travel direction displays (not shown), front and rear driving lights (parking, low-beam, and upper-beam lights, not shown), lower front and rear work lights to illuminate the field during working operation (not shown), upper front and rear work lights to illuminate the field during working operation, which can be attached to the roof of the cabin 22 (not shown). In addition, the control unit 34 controls the illumination devices (not shown) of the implement (for example, position lights, travel direction displays, lights for illuminating the field.

The control unit 34 operates, particularly during road driving operation, as a function of operator inputs, and controls of the illumination of the vehicle 10 and of the implement 12. During field working operation, the control unit 34 receives data from the implement control unit 36, which includes information regarding the work width and/or work height and/or position of the implement 12 with respect to the vehicle 10. Such data could include, for example, the following data: orientation of the front axle of the implement 12, orientation of the horizontal transverse axle of the implement 12, orientation of the vertical axis of the implement 12, the position of the reference point of the vehicle 10, the position of the connection point of the implement 12 on the vehicle 10, the position of the reference point of the implement 12, the position of the reference point of work elements of the implement 12, the position of the reference point of a positioning system (not shown), which can be on the vehicle 10 or on the accessory equipment 12, the offset between the position of the reference point of the positioning system, and the position of the reference point of the vehicle 10 (in three dimensions), the offset between the position of the reference point of the vehicle 10 and the position of the connection point of the implement 12 on the vehicle 10 (in three dimensions), the work width of the implement 12 and/or of elements of the implement 12 and/or the offset between the position of the reference point of the implement 12 and the position of the reference point of work elements of the implement 12 (at least in the forward direction and vertical direction).

Such data is transmitted in accordance with the ISO 11783 protocol (part 10) for navigation purposes via the bus 32, the disclosure of which is included by reference in the following documentation. For this purpose, the utility vehicle includes one or more antennas for receiving signals of a satellite-based positioning system, and it uses appropriate data from the such data for planning the route of the vehicle 10 and/or for documenting the path travelled and/or for the navigation of the vehicle 10, particularly to achieve that a reference point on the implement 12 is moved along a target path.

An actuator 40 is also connected via the bus 32 to the vehicle control unit 34. The vehicle control unit 34 derives, from single or several of such data, steering signals for the actuator 40 which controls the vertical and/or horizontal adjustment of the light source 38. Moreover, an additional actuator (not shown) can be provided for adjusting opening angle of the light cone of the light source light source 38. In this way, the control unit 34 can control the orientation and/or the size of the light cone of the light source 38, and it aligns it optimally with respect to the given implement 12.

If the implement 12 has a considerable work width, such as a field sprayer, then the control unit 34 flares the light cone of the light source 38 relatively broadly and far outward. If the implement 12, on the other hand, is a plough or a soil implement (not shown), which has a relatively small work width, the data pertaining to the smaller work width is communicated to the control unit 34, and the latter will align the light source 38 by means of the actuator 40 with respect to the smaller work widths. In the case of a plough, this alignment can be asymmetric with respect to the longitudinal middle plane of the vehicle 10. Thus, no manual reorientation of light source 38 is needed when exchanging the implement 12.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

I claim:

1. In a utility vehicle to which an implement is removably coupled thereto, the utility vehicle having a vehicle control unit and a light source mounted on the vehicle for illuminating the implement, the light source having an orientation and a light cone, and a control system for controlling the light source, the control system comprising:
    an actuator connected to the vehicle control unit, the actuator adjusting at least one of the orientation and an opening angle of the light cone;
    an implement control unit mounted on the implement; and
    a data bus connected to the vehicle control unit and to the implement control unit, wherein the implement control unit controls the implement and transmits to the vehicle control unit, via the data bus, data regarding the implement, the vehicle control unit controlling the actuator as a function of the data transmitted by the implement control unit.

2. The control system of claim 1, wherein:
    the actuator adjusts the horizontal and/or vertical orientation of the light source.

3. The control system of claim 1, wherein:
    the implement control unit transmits, via the bus, data representing an attachment point of the implement with respect to the utility vehicle; and
    the vehicle control unit controls the actuator in response to the data representing an attachment point.

4. The control system of claim 1, wherein:
    the light source is attached on the utility vehicle.

5. The control system of claim 1, wherein:
    the data regarding the implement comprises a work width of the implement.

6. The control system of claim 1, wherein:
    the data regarding the implement comprises a work height of the implement.

7. The control system of claim 1, wherein:
    the data regarding the implement comprises a position of the implement with respect to the utility vehicle.

* * * * *